US006722703B2

(12) United States Patent
Takayanagi

(10) Patent No.: US 6,722,703 B2
(45) Date of Patent: Apr. 20, 2004

(54) QUICK CONNECTOR WITH FUNCTION OF VERIFYING COMPLETE CONNECTION

(75) Inventor: Akira Takayanagi, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/375,431

(22) Filed: Feb. 27, 2003

(65) Prior Publication Data

US 2003/0160448 A1 Aug. 28, 2003

(30) Foreign Application Priority Data

Feb. 28, 2002 (JP) ........................ 2002-055048

(51) Int. Cl.[7] ................................................ F16L 35/00
(52) U.S. Cl. ........................................ 285/93; 285/319
(58) Field of Search ........................... 285/93, 305, 319

(56) References Cited

U.S. PATENT DOCUMENTS

| 4,753,458 A | * | 6/1988 | Case et al. ............. 285/93 |
| 4,946,205 A | * | 8/1990 | Washizu ................ 285/319 |
| 5,152,555 A | | 10/1992 | Szabo |
| 5,342,099 A | * | 8/1994 | Bahner et al. ......... 285/93 |
| 5,897,145 A | * | 4/1999 | Kondo et al. .......... 285/93 |
| 6,082,779 A | * | 7/2000 | Lesser et al. .......... 285/93 |
| 6,129,393 A | * | 10/2000 | Kodama et al. ........ 285/319 |
| 6,145,886 A | * | 11/2000 | Ohta et al. ............. 285/4 |
| 6,328,344 B1 | * | 12/2001 | Tozaki et al. .......... 285/93 |
| 2002/0158465 A1 | * | 10/2002 | Tsurumi ................. 285/93 |

FOREIGN PATENT DOCUMENTS

| JP | 1-224593 | * | 1/1989 | ........... 285/93 |
| JP | 11-344182 | | 11/1999 | |
| WO | WO 94/27077 | * | 11/1994 | ........... 285/93 |

OTHER PUBLICATIONS

English translation of JP 11-344182.

* cited by examiner

Primary Examiner—Eric K. Nicholson
(74) Attorney, Agent, or Firm—Andrus, Sceales, Starke & Sawall

(57) ABSTRACT

A checker comprises a thin-walled checker body, a pull-ring and inwardly directed engagement portions. The pull-ring is formed on a widthwise center part of an outer peripheral portion of the checker body. The inwardly directed engagement portions are formed on widthwise opposite ends of the checker body. The checker is fitted and mounted on a connector housing so that the checker body seats in a fit-in slot defined by elongate ribs formed on a flat region of the connector housing and the inwardly directed engagement portions snap in and locking engage with engagement windows of the connector housing.

8 Claims, 16 Drawing Sheets

US 6,722,703 B2

1

QUICK CONNECTOR WITH FUNCTION OF VERIFYING COMPLETE CONNECTION

BACKGROUND OF THE INVENTION

The present invention relates to a quick connector having a function to verify that a pipe is correctly connected to the quick connector in snap-engagement relation, for example, adapted in assembly in a fuel piping of an automobile.

In a fluid piping structure, for example, a gasoline fuel piping structure where a tube is joined to a pipe, a connector is used for joining the tube to the pipe. In such piping system, for example, the pipe includes an inserting end portion on one axial side thereof wherein an annular engagement projection is formed on and around an outer peripheral surface. Then, the inserting end portion of the pipe is inserted and fitted in the connector so that the annular engagement projection snap-engages in the connector to provide locking relation between the pipe and the connector. Thereby connection between the pipe and the connector is completed. A quick connector adapted in this manner comprises a tubular connector housing provided with a tube connecting portion on one axial side thereof and an annular or generally annular retainer. The connector housing has a retainer holding portion on an opposite axial side, wherein at least one engagement window is provided, for example, a pair of engagement windows are provided in diametrically opposed relation with one another. The retainer is configured so that the annular engagement projection of the pipe snap-engages therewith, and is fitted in the retainer holding portion to engage with the engagement window. That is, the pipe is inserted in the retainer so that the annular engagement projection of the inserting end portion snap-engages with the retainer. Thereby the pipe is fitted in and connected to the quick connector. However, if an operator does not take care sufficiently to complete connection between the pipe and the connector, the inserting end portion of the pipe might not be fully inserted into the retainer or the connector and the annular engagement projection of the pipe might not snap-engage with the retainer. Thus, the pipe might be in so-called half-fitting relation with respect to the connector. In case of a piping system subject to operation while the pipe is incompletely connected to the connector, as sealing property by a sealing member between the connector and the pipe is insufficient or becomes insufficient, an inner fluid usually leaks out.

Then, in order to easily verify complete connection of a pipe to a quick connector, a checker is adapted to provide the connector with a function of verifying complete connection. A checker for verifying complete connection usually has a checker body configured to have inner surface curving along or generally along an outer peripheral surface of a connector housing. The checker body is provided with a pull-out portion and at least one engagement portion. The engagement portion is integrally formed on the checker body, for example, on opposite ends or opposite end portions respectively of the checker body. The checker is fitted on the connector housing, for example, an outer peripheral surface between engagement windows wherein the engagement portion engages with, for example, snap-engages with the engagement window to restrain movement of the checker in a pull-out direction. The checker is configured to be allowable for being pulled out by the engagement portion or engagement portions deflecting and moving, for example, radially outwardly, being pressed by the annular engagement projection when the pipe is correctly fitted in the connector

2 and the annular engagement projection of the inserting end portion snap-engages with the retainer. Accordingly, upon completion of connection work of the pipe and the quick connector, it can be verified that the pipe is completely connected in the quick connector by pulling the checker out of the connector housing with the pull-out portion in a direction perpendicular to an axial direction of the connector housing. If the checker cannot be removed out of the connector housing when the checker is pulled, mostly the pipe is not completely connected to the quick connector. In such case, connection work of the pipe and the quick connector should be again implemented so that the inserting end portion of the pipe is fully inserted in the quick connector.

Meanwhile, in thus configured quick connector, a locking portion of the engagement portion of the checker to be engaged in or with the engagement window is formed typically short or small sized, so that the checker can be surely pulled out when the pipe is engaged with retainer. Hence, if the checker is pulled obliquely, for example, obliquely toward an opposite axial side of the connector housing, as the checker is inclined, and an engagement portion of the checker is deformed, engagement between the locking portion and the engagement window is likely to be released. In that event, it may occur that the checker is pulled out in spite of incomplete connection between the pipe and the quick connector. In order to avoid such inconvenience, JP, A, 11-344182 discloses a structure for verifying complete connection wherein a checker body is provided with an inclining restraint portion extending in an axial direction of the connector housing. The checker is fitted on the connector housing so that the inclining restraint portion contacts an outer peripheral surface of the connector housing and embraces a large diameter retainer holding portion of the connector housing from axial opposite sides thereof.

If the structure for verifying complete connection disclosed in JP, A, 11-344182 is applied, thanks to restraint force of the inclining restraint portion there is little danger that the checker is inclined even if the checker is pulled obliquely. Then, the checker is effectively prevented from being pulled out of the connector housing under incomplete connection between the pipe and the quick connector. However, the structure for verifying complete connection is configured to be adapted to a quick connector which is provided with a large diameter retainer holding portion on an opposite axial side of the connector housing and with a sufficiently large step or stepped portion on one axial end of the retainer holding portion. So, it is impossible or difficult to adapt this structure for verifying complete connection to a quick connector wherein a tube connecting portion is formed integrally and directly on one axial end of the retainer holding portion and a tube is fitted over up to a position of an opposite axial end of the tube connecting portion to generally even out a step or stepped portion or to reduce a step or stepped portion in height. And, in case that the inclining restraint portion providing a structure not to embrace a retainer holding portion from both axial opposite sides and to fit thereon, restraint effectiveness of the inclining restraint portion is reduced by half.

Further, in order to deal with a problem that a checker is easily pulled out when inclined, known is a structure as cited as a prior art in the JP, A, 11-344182 and as disclosed in U.S. Pat. No. 5,152,555. In this structure, slots are formed on one axial end positions of circumferential ends of engagement windows of a connector housing, and a checker is fitted on a connector housing so that portions near engagement portions of a checker body, i.e., leg portions are slip-fitted in the slots. However, the leg portions are fitted and mounted on the connector housing so as to embrace an outer peripheral surface thereof, and thereby are unlikely to move largely in an axial direction under external force. Hence, sometimes this structure for restraining the leg portions from moving axially may not be expected to provide a satisfactory function to effectively prevent inconvenience that the checker is pulled out accidentally or mistakenly.

SUMMARY OF THE INVENTION

Accordingly, it is an object of the present invention to provide a quick connector with function of verifying complete connection which enables to effectively prevent inconvenience that a checker is inclined due to axial movement of a checker body, even without adapting a step or step portion facing an axial direction of a retainer holding portion of a connector housing.

In order to achieve a foregoing object, there is provided a novel quick connector to be connected with a pipe which has an inserting end portion formed with an annular engagement projection, for example, on one axial side thereof, and having a function to verify complete connection with the pipe. The quick connector has a tubular connector housing. The tubular connector housing is provided with a tube connecting portion to be connected with a tube (including a hose or the like) on one axial side thereof or one side in a direction of an axis of the quick connector or the connector housing, and a retainer holding portion having at least one engagement window, for example, a pair of engagement windows in opposed relation with one another on an opposite axial side thereof or an opposite side in a direction of an axis of the quick connector or the connector housing. The quick connector also has an annular or generally annular retainer. The retainer is configured so that the annular engagement projection of the pipe snap-engages with the retainer when the inserting end portion of the pipe is inserted in the connector housing, and fitted to the retainer holding portion to engage with the engagement window (including a portion surrounding the engagement window). The quick connector further has a checker. The checker has a checker body configured so as to be along or generally along an outer peripheral surface of the connector housing or so as to include an inner surface being along or generally along an outer peripheral surface of the connector housing, for example, an outer peripheral surface between the engagement windows. The checker body is provided with a pull-out portion and integrally at least one engagement portion, for example, engagement portions formed on opposite ends or opposite end portions thereof respectively. The checker is fitted or mounted on an outer peripheral surface of the connector housing, for example, an outer peripheral surface between the engagement windows, being locked in a pull-out direction by engagement or snap-engagement between the engagement portion and the engagement window (including a portion surrounding the engagement window). The engagement portion of the checker body is pushed by the annular engagement projection, thereby deformed or deflected and moved, for example, radially outwardly, to allow the checker to be pulled out when snap-engagement between the annular engagement projection and the retainer brings about complete connection between the pipe and the quick connector. The connector housing or an outer peripheral surface of the connector housing, for example, an outer peripheral surface between the engagement windows is provided integrally with a pair of axial movement preventive means projecting radially outwardly in axially spaced relation with one another to restrain axial movement of the checker body. The axial movement preventive means respectively has one circumferential end portion and the other circumferential end portion circumferentially spaced a proper distance from the one circumferential end portion. The checker body of the checker is fitted in an axial space defined between a pair of the axial movement preventive means so as to be restrained to move toward one axial side and an opposite axial side of the connector housing. A portion of the checker body, for example, a portion around the pull-out portion which is likely to move largely in an axial direction under external force is locked against movement or displacement in an axial direction by contact or abutment with the axial movement preventive means. The engagement portion is designated to have a locking engagement function to lock in the engagement window, and a release function to unlock locking engagement by being pushed by the annular engagement projection of the pipe. Further, the engagement portion may also have a holding function in order that the checker is not released out of the connector housing quite easily, when locking engagement is unlocked. The engagement portion may be configured as inwardly directed engagement portion to seat in the engagement window.

Typically, the retainer is fitted in the retainer holding portion so that the pipe engagement portion to be engaged with the annular engagement projection of a pipe, for example, one axial end portion is shown in the engagement window. Also, typically the checker is fitted onto the connector housing so that an axial position of an engagement portion corresponds to an axial position of a pipe engagement portion of the retainer, for example, to an axial position of the annular engagement projection of the pipe in engagement with the retainer. If a pipe engagement portion of the retainer is formed as an engagement slit extending circumferentially on one axial end portion thereof, the retainer is fitted in the retainer holding portion so as to show the engagement slit in the engagement window, and the checker is fitted onto the retainer holding portion so that an axial position of the engagement portion corresponds to an axial position of the engagement slit, more specifically, so that a radially inner end of the engagement portion seats inside the retainer holding portion, further specifically in the engagement slit through the engagement window. The axial movement preventive means respectively is configured to lock the checker body against movement or displacement in an axial direction, in abutment or contact relation with the checker body of the checker fitted on the connector housing, for example, as stated above.

The axial movement preventive means respectively has one circumferential end portion and the other circumferential end portion circumferentially spaced a proper distance from the one circumferential end portion. That is, the axial movement preventive means respectively, for example, comprises an elongate rib formed integrally with one circumferential end portion, middle portion and the other circumferential end portion so as to extend circumferentially an appropriate length, or two raised portions (projecting portions or protrusions) properly spaced circumferentially with one another (one raised portion corresponds to one circumferential end portion and the other raised portion corresponds to the other circumferential end portion). So, when the checker is pulled obliquely, or an external force is exerted obliquely onto the checker and the checker body is pressed against the axial movement preventive means, the checker body is hardly deflected or kinked. Consequently, it is effectively prevented that the checker is pulled out accidentally. And, the axial movement preventive means may be formed so as to be across a certain circumferential distance on the connector housing. In this case, the axial movement preventive means are configured so that an entire of circumferential or widthwise length or a part of the checker body is fitted in an axial space defined therebetween. For example, a part of the checker body to be fitted in the axial space may be a circumferential or widthwise center portion of the checker body, or a portion around the pull-out portion of the checker body. If the axial movement preventive means are configured to fit only for a part of the checker body, it is easier to fit or mount the checker on the connector housing, compared to the case that the axial movement preventive means are configured to fit for an entire circumferential or widthwise length of the checker body. If an axial space between a pair of the axial movement preventive means is designed generally identical to thickness of the checker body, more specifically, thickness of a portion of the checker body to be fitted in the axial space defined therebetween, the checker is hardly inclined, for example, even if the checker is pulled obliquely in an axial direction. If the axial movement preventive means are formed as elongate rib, stability of the checker is enhanced. If the axial movement preventive means are formed as two raised portions, mounting property of the checker is further enhanced.

When pull force or the like is exerted on the checker body in a circumferential direction, the checker also might be pulled out depending on the configuration or the like of the engagement portion of the checker. Therefore, the checker body may be formed integrally with a pair of circumferential movement preventive means to prevent the checker body from movement toward one and the other circumferential directions in abutment or contact relation with one circumferential end and the other circumferential end of the axial movement preventive means. The circumferential movement preventive means on widthwise opposite sides of the checker body may be respectively configured as an axial projection integrally with the checker body. The checker body referred here is in state of being fitted on the connector housing, and the axial projection is extending axially of the connector housing.

When the pipe is correctly connected with the quick connector, locking engagement between the engagement portion of the checker and the engagement windows is released, and the released relation therebetween is maintained. In some cases, even if the checker is in released state, the checker is held in position, not to come off the connector housing very easily. However, usually, even in this state, if an operator touches carelessly the checker, it is fear that the checker comes off the quick connector, falls, for example, within a piping structure of an automobile, and is not accessible easily. Therefore, the checker body may be configured so that the axial projections are engaged with one circumferential end and the other circumferential end of the axial movement preventive means in a pull-out direction not to allow the checker body to come out easily between the axial movement preventive means when the checker body is fitted in an axial space between the axial movement preventive means.

A structure for verifying complete connection according to the present invention is suitable especially for a connector having a tube connecting portion integrally provided on one axial end of a retainer holding portion and being configured so that a tube is fitted over up to a position of an opposite axial end of the tube connecting portion.

A quick connector with function of verifying complete connection of present invention can effectively prevent that a checker is pulled out accidentally even if a connector housing has no specific stepped portion or stepped configuration on an outer peripheral surface thereof, and therefore has a function of verifying complete connection with a pipe accurately.

Now, the preferred embodiments of the present invention will be described in detail with reference to the drawings.

DETAILED DESCRIPTION OF THE PREFERRED EMBODIMENTS

Figure 1:
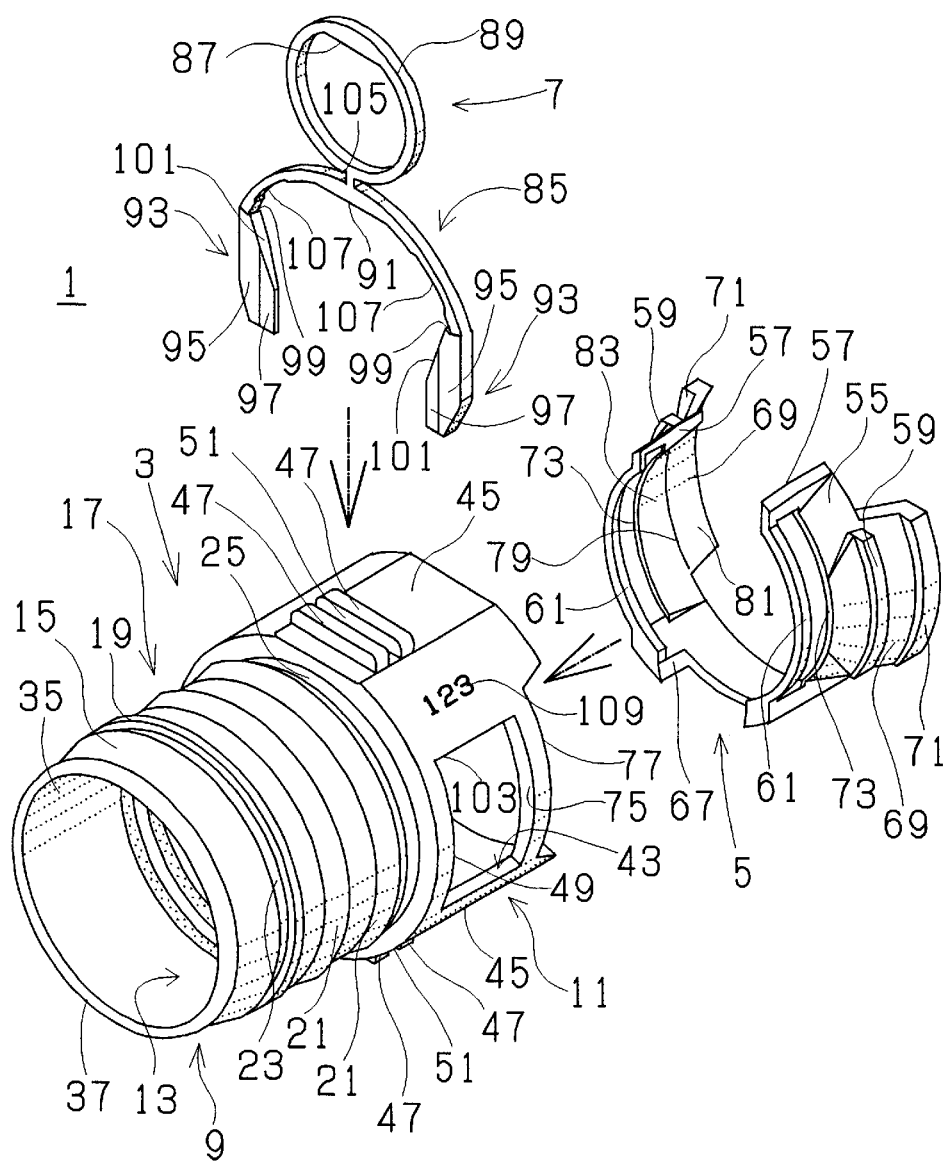
FIG. 1 is a perspective exploded view of a quick connector with function of verifying complete connection of the present invention.

A quick connector 1 with function of verifying complete connection, which is adapted for assembly in a gasoline fuel piping of an automobile, as shown in FIG. 1, comprises a tubular connector housing 3, a generally annular retainer 5 and a checker 7 for verifying complete connection between a pipe and the quick connector 1 itself.

Figure 4:
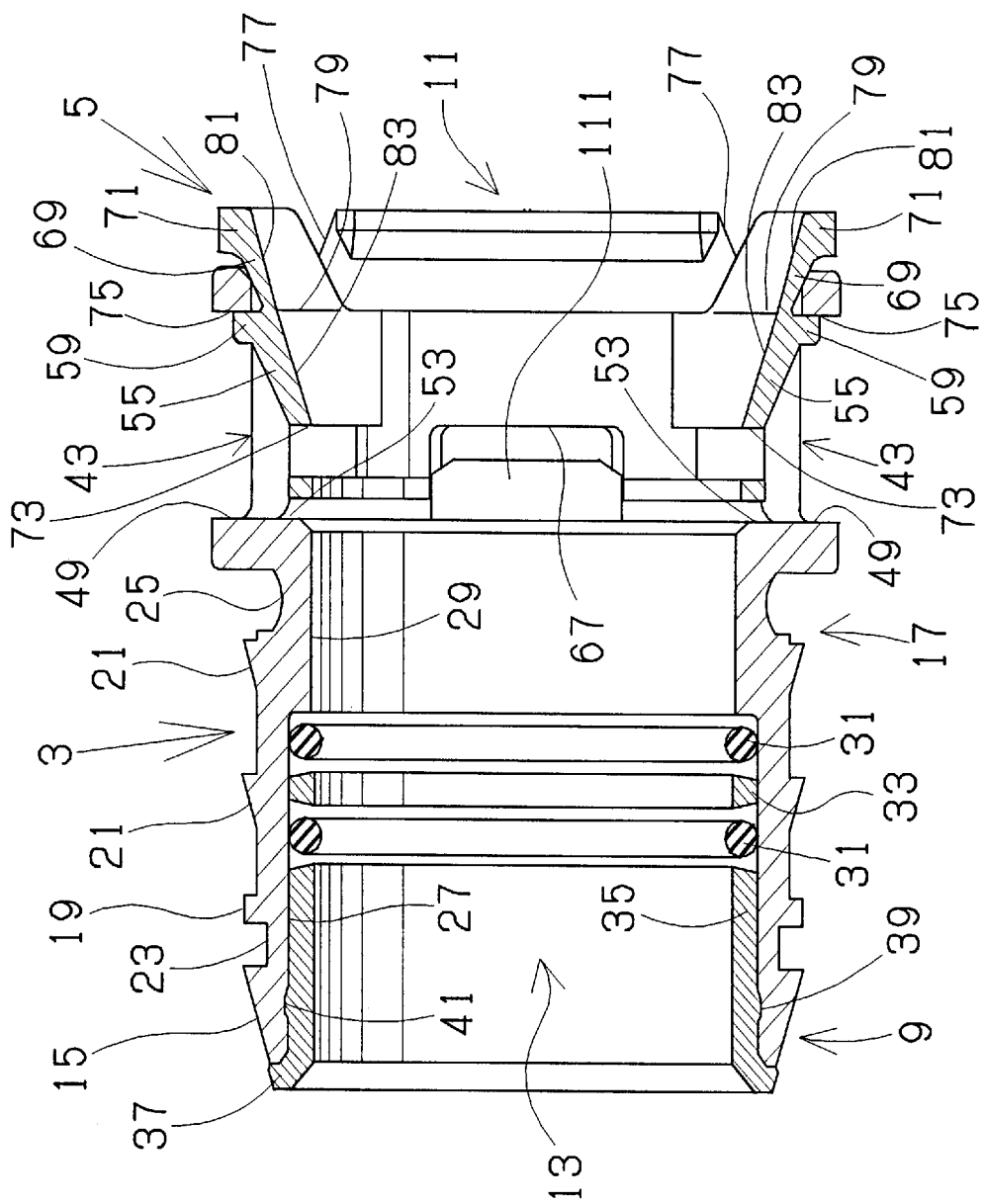
FIG. 4 is a sectional view taken in an axial direction of a retainer fitted in a connector housing.

As well shown in FIGS. 1 and 4, the connector housing 3 made of glass fiber reinforced polyamide (PA•GF), integrally comprises a cylindrical resin tube connecting portion 9 on one axial side thereof and a generally cylindrical retainer holding portion 11 on an opposite axial side thereof, and is provided with a through-bore 13 through from one axial end to an opposite axial end thereof. The resin tube connecting portion 9 comprises one axial side portion 15 generally like right-angle triangle in cross-section having an outer peripheral surface expanding gently in diameter toward an opposite axial side, and an opposite axial side portion 17 having an outer peripheral surface extending generally like a simple cylindrical shape on an opposite axial side from the one axial side portion 15. The opposite axial side portion 17 is provided on an outer peripheral surface with an annular projecting stop portion 19 generally like rectangular in cross-section and two annular projecting stop portions 21, 21 generally like right-angle triangle in cross-section expanding in diameter toward an opposite axial side. The annular projecting stop portion 19 and the annular projecting stop portions 21, 21 are arranged in axially spaced relation sequentially from one axial side to an opposite axial side. A resin tube (not shown), for example a resin pipe member is tightly fitted on and connected to an outer periphery or an outer peripheral surface of the resin tube connecting portion 9. An outer peripheral surface 23 on one axial end portion of the opposite axial side portion 17, namely a portion between the one axial side portion 15 and the annular projecting stop portion 19 is formed in small diameter or in deep annular groove, while an outer peripheral surface 25 on the opposite axial end portion 17 thereof, namely a portion from an opposite axial side slightly from the annular projecting stop portion 21 on an opposite axial side to the retainer holding portion 11, is formed in smaller diameter or in deeper groove compared to the outer peripheral surface 23 on one axial end portion. An O-ring for sealing is fitted on the outer peripheral surface 23 on one axial end portion of the opposite axial side portion 17 to provide a sealing with regard to the resin tube, and a large diameter O-ring for sealing might also be fitted on the outer peripheral surface 25 on an opposite axial end portion of the opposite axial side portion 17 to provide a sealing with respect to the resin tube.

As well shown in FIG. 4, an inner peripheral surface of the resin tube connecting portion 9 comprises a large diameter portion 27 on one axial side thereof and a small diameter portion 29 on an opposite axial side thereof. Within the large diameter portion 27, a pair of O-rings 31, 31 are fitted axially in side by side relation with a collar 33 therebetween on an opposite axial side thereof, and a resin bush 35 is fitted on one axial side thereof. The resin bush 35 is formed generally in a cylindrical shape, and integrally has an annular engagement portion 37 on one axial end portion thereof. The resin bush 35 is provided with a low annular projection 39 on an outer peripheral surface toward one axial end thereof. The annular engagement portion 37 is formed so as to project somewhat radially outwardly. The resin bush 35 has an inner diameter substantially identical to an inner diameter of the small diameter portion 29, and is fitted in the large diameter portion 27 so that the annular engagement projection 39 seats in a shallow annular groove 41 formed toward one axial end of the large diameter portion 27 and the annular engagement portion 37 engages with one axial end portion of the resin tube connecting portion 9. The O-rings 31, 31 are axially maintained in a space between the resin bush 35 and a stepped surface between the small diameter portion 29 and the large diameter portion 27.

Figure 5:
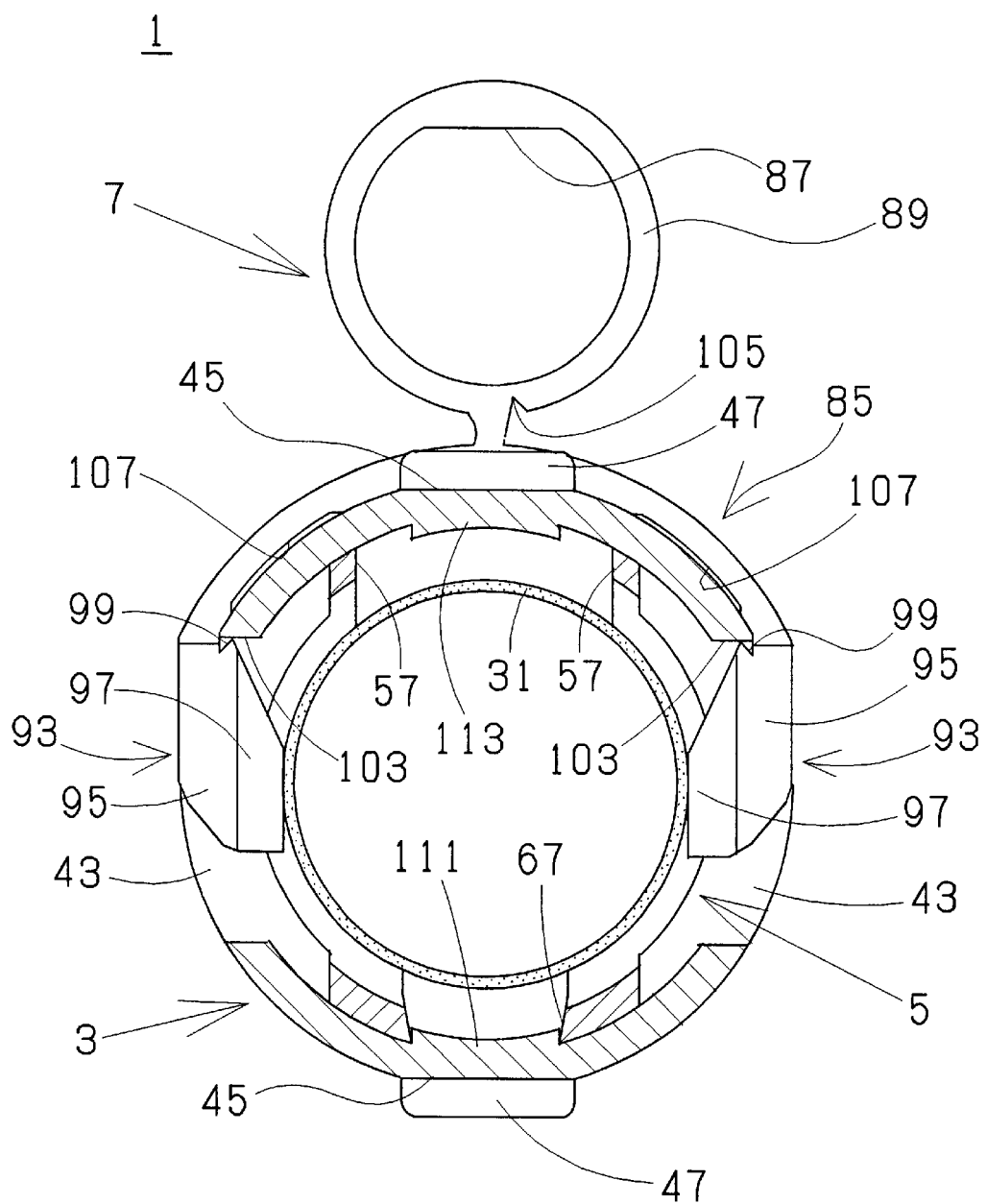
FIG. 5 is a sectional view taken in a radial direction of the quick connector with function of verifying complete connection.

As well shown in FIGS. 1, 4 and 5, the generally cylindrical retainer holding portion 11 of a larger diameter than the resin tube connecting portion 9, is provided with engagement windows 43, 43 in diametrically symmetrical positions and in opposed relation with one another, and flat regions 45, 45 on the outer peripheral surfaces respectively in diametrical opposed positions between the engagement windows 43, 43. The flat region 45 extends entire axial length of the retainer holding portion 11 with width or a circumferential length of substantially one third of an outer diameter of the retainer holding portion 11. Two elongate ribs 47, 47 of uniform configuration are formed on one flat region 45 and the other flat region 45 respectively on one axial side thereof. The elongate ribs 47, 47 are located parallel with one another, in axially slightly spaced relation with one another. Each elongate rib 47 extends circumferentially the entire width, or from one circumferential end to an opposite circumferential end of the flat region 45. The elongate rib 47 of one axial side is located toward on an opposite axial side compared to one axial ends 49, 49 of the engagement windows 43, 43, and thereby a fit-in slot or an axial space 51 defined by the elongate ribs 47, 47 is formed somewhat toward on an opposite axial side compared to the one axial ends 49, 49 of the engagement windows 43, 43. The retainer holding portion 11 is internally provided with a narrow annular abutment surface 53 extending radially inwardly on one axial end. The annular abutment surface 53 is coplanar with one axial ends, namely the one axial end surfaces 49, 49 of the engagement windows 43, 43. That is, no step or no stepped portion exists between the one axial ends 49, 49 of the engagement windows 43, 43 and the annular abutment surface 53.

Figure 8:
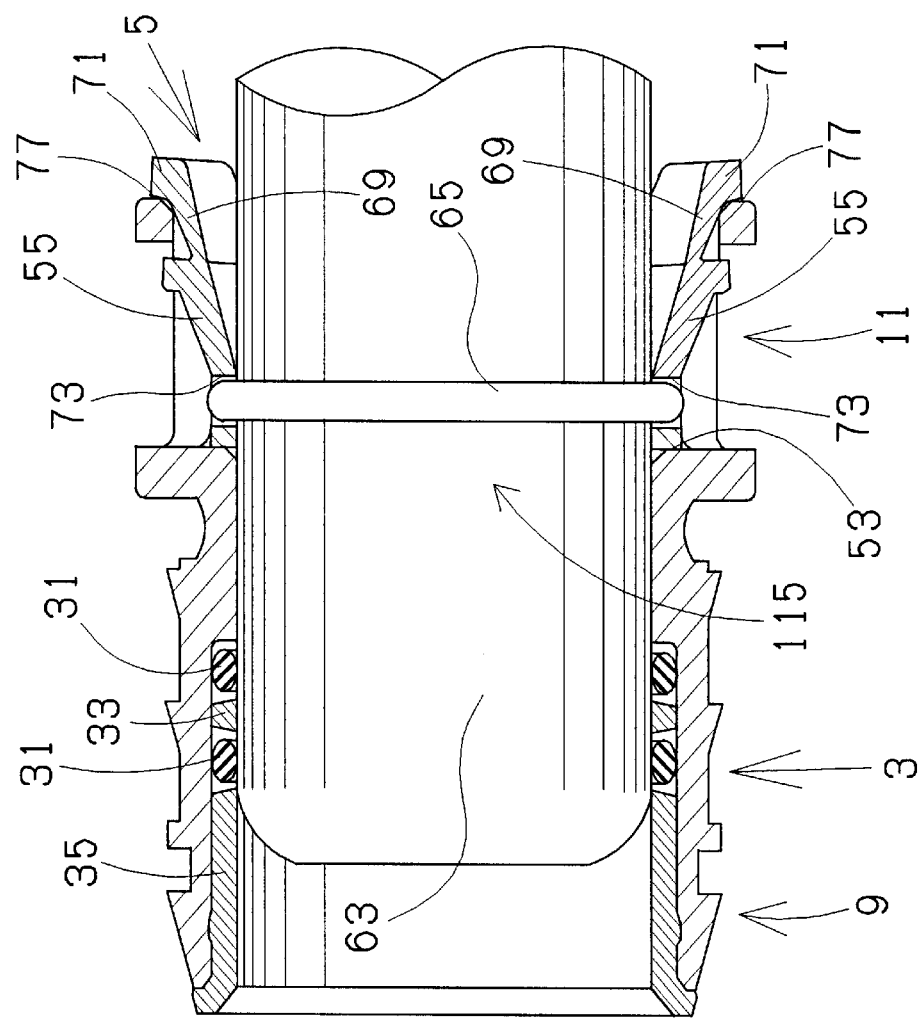
FIG. 8 is a sectional view taken in an axial direction showing the checker pulled out after the pipe is inserted in and connected with the quick connector with function of verifying complete connection.

As well shown in FIGS. 1 and 4, the retainer 5 made of PA is fitted in the retainer holding portion 11. This retainer 5 is relatively flexible, and is formed so as to be resiliently deformable. The retainer 5 has a main body 55 of C-shape in cross-section, namely generally annular shape wherein a relatively large space is defined between circumferential opposite end portions 57, 57 thereof. The main body 55 is provided with a pair of engagement tabs 59, 59 projecting radially outwardly in symmetrical positions to one another, in diametrically opposed positions of an opposite axial end portion thereof. An inner surface of the main body 55, except a portion diametrically opposed to the space for deformation, is tapered generally in the direction toward one axial side thereof so as to reduce gradually an inner diameter thereof. And, apart from a portion diametrically opposed to the space for deformation, one axial end portion 61 of the main body 55 is formed with an inner diameter almost identical to a pipe (refer to a reference numeral 63 in FIG. 8), and smaller than an annular engagement projection (refer to a reference numeral 65 in FIG. 8). The inner surface of the portion diametrically opposed to the space for deformation of the main body 55 has an inner surface like a portion of a cylindrical inner surface shape, and is formed with a recessed portion 67 on one axial end portion thereof.

A pair of operation arms 69, 69 are integrally formed on an opposite axial end portion of the main body 55 of the retainer 5 so as to extend inclining radially outwardly in an opposite direction axially from respective circumferential positions corresponding to the engagement tabs 59, 59. The operation arm 69 respectively, has a latching end 71 projecting radially outwardly on an opposite axial end portion thereof. The one axial end portion 61 of the main body 55 is provided with engagement slits 73, 73 extending circumferentially in opposed relation with one another. Thus configured retainer 5 is inserted and fitted in the retainer holding portion 11 from an opening on the opposite axial end thereof, so that the engagement tabs 59, 59 seat in the engagement windows 43, 43, of the retainer holding portion 11 in engagement relation with opposite axial ends 75, 75 of the engagement windows 43, 43 and that the latching ends 71, 71 seats in receiving recessed portions 77, 77 of the retainer holding portion 11 in engagement condition. The receiving recessed portions 77, 77 are formed on an opposite axial end portion of the retainer holding portion 11, so as to correspond to circumferential positions of the engagement windows 43, 43 respectively. As the latching end 71 of the operation arm 69 is received in the receiving recessed portion 77, it is prevented that the retainer 5 moves from its correct position in the retainer holding portion 11, when the latching end 71 is just touched carelessly by an operator. Opposed inner surface 79, 79 of the retainer 5 with arcuate shape in cross-section which are extending respectively from the operation arms 69, 69 to the engagement slits 73, 73 are generally tapered respectively in a direction of one axial side toward the center or the central axis of the retainer 5. Each of the tapered inner surfaces 79, 79 of the retainer 5 comprises a tapered inner surface 81 of the operation arm 69 and a tapered inner surface 83 of the main body 55. The opposed inner surfaces 83, 83 in the main body 55 are tapered respectively at somewhat smaller angle or somewhat gently than the inner surfaces 81, 81 of the operation arms 69, 69. And then the retainer 5 is configured so that the annular engagement projection 65 of the pipe 63 necessarily or substantially necessarily abuts the opposite axial ends of the opposite tapered inner surfaces 83, 83 in the main body 59 when the pipe 63 is inserted in the main body 55 of the retainer 5 from the side of the latching ends 71, 71 of the operation arms 69, 69. That is, the annular engagement projection 65 of the pipe 63 abuts the tapered inner surfaces 79, 79 of the retainer 5 at a boundary between the operation arms 69, 69 and the main body 55 at insertion of the pipe 63.

Figure 2:
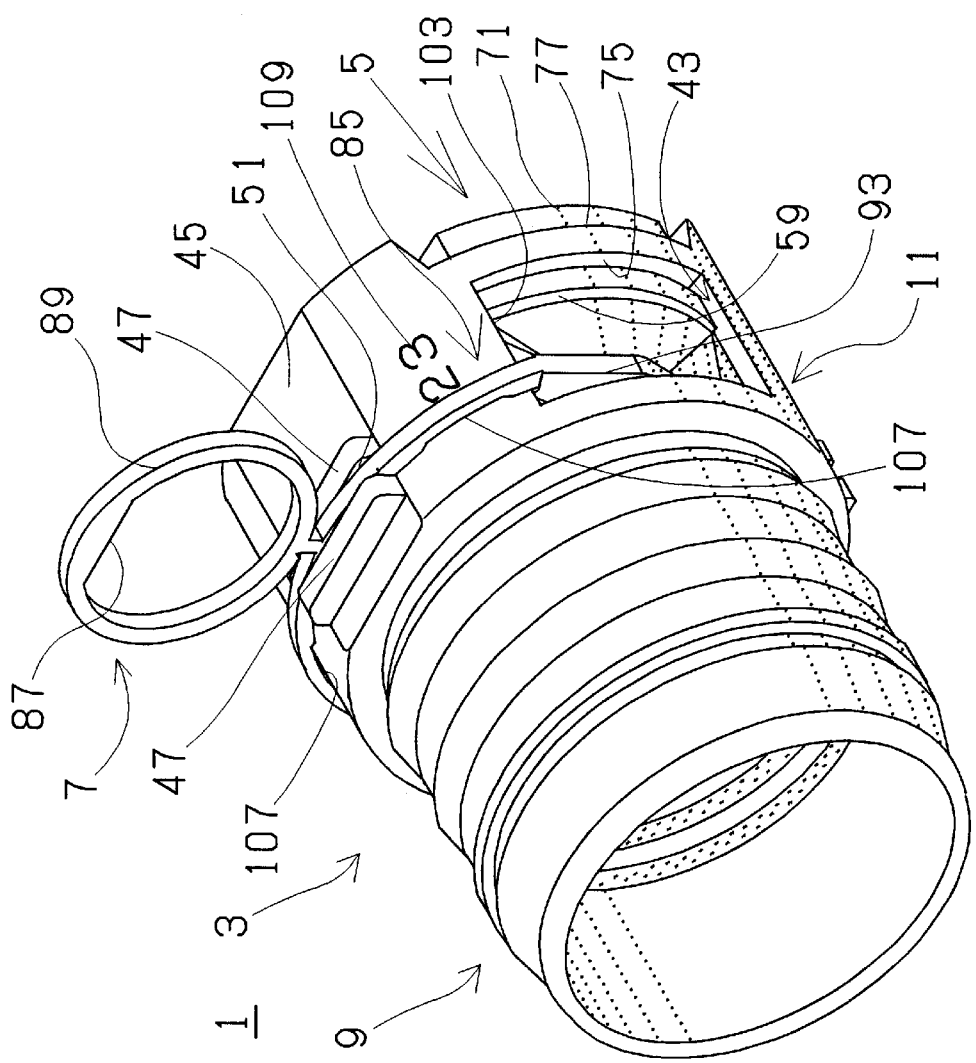
FIG. 2 is an assembled perspective view of the quick connector with function of verifying complete connection.
Figure 6:
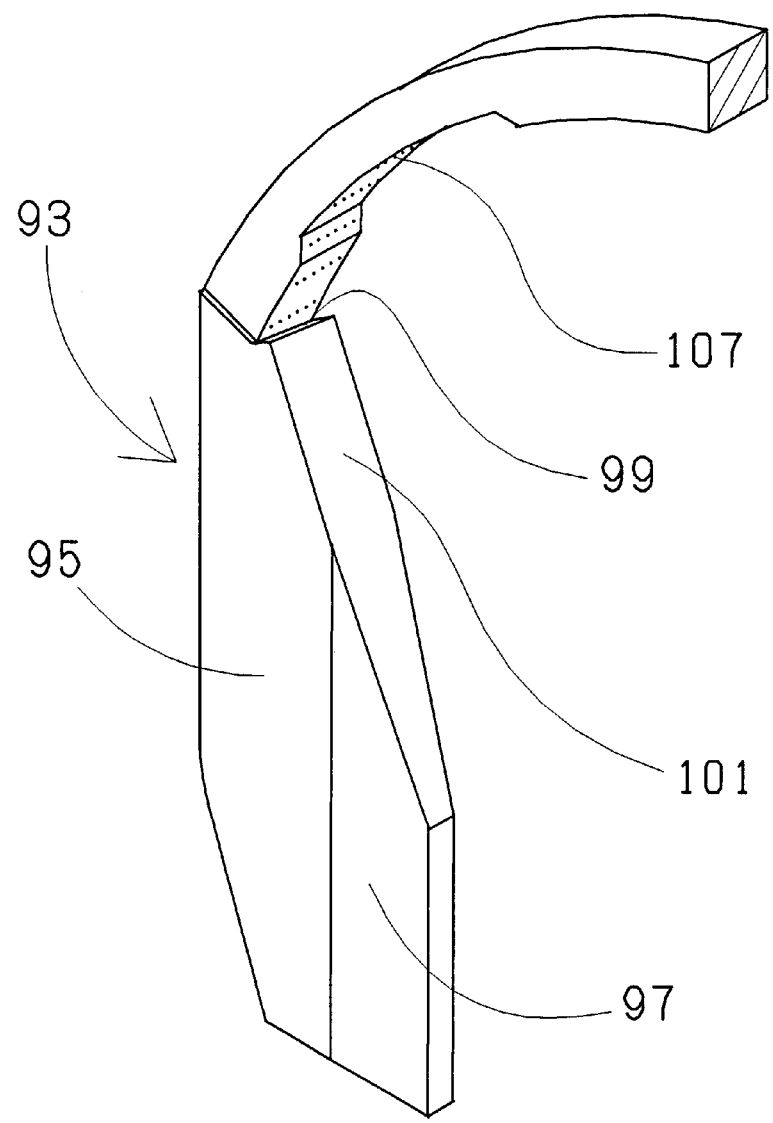
FIG. 6 is an enlarged view of a portion of an inwardly directed engagement portion of a checker.
Figure 7:
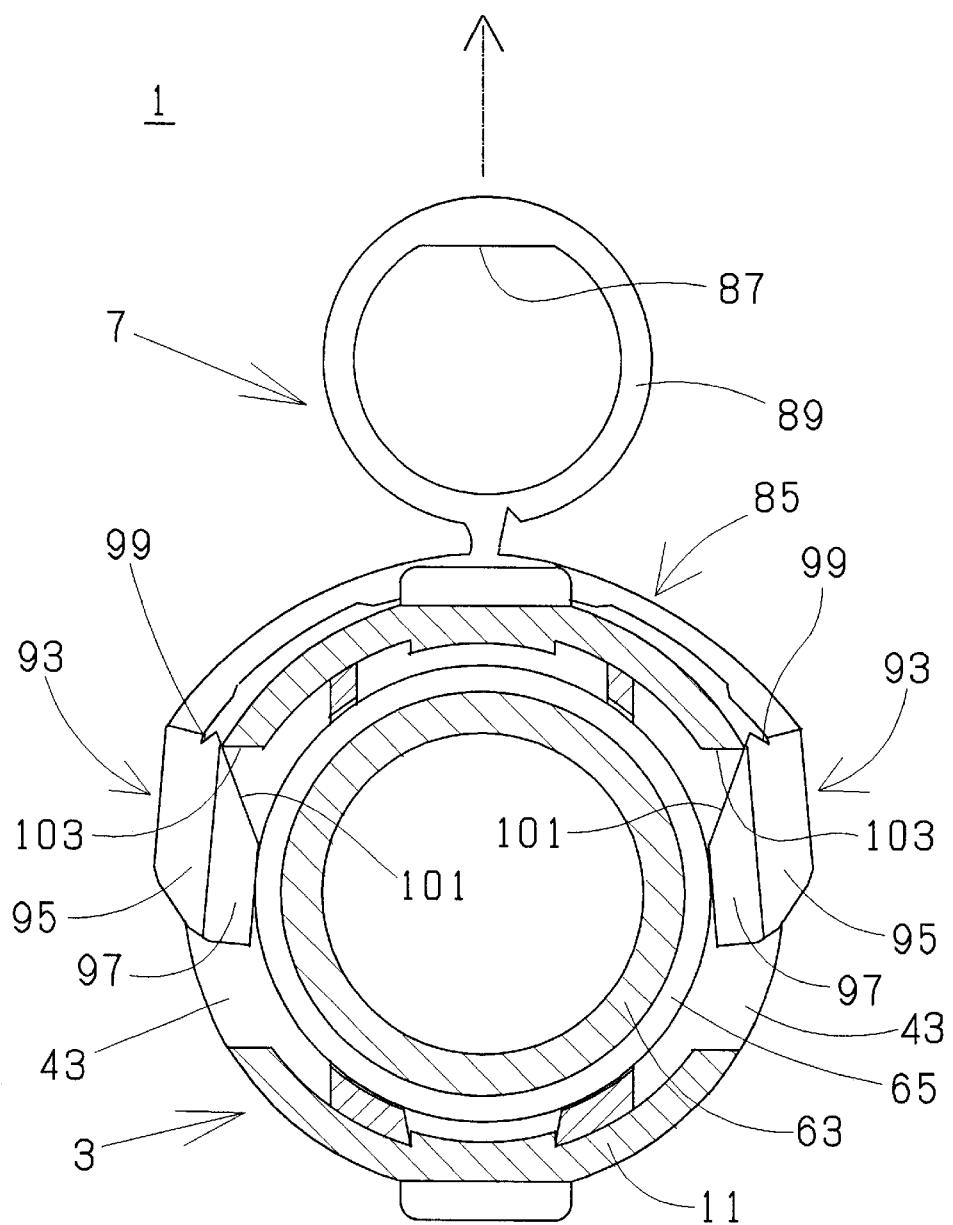
FIG. 7 is a sectional view taken in a radial direction showing a pipe inserted in and connected with the quick connector with function of verifying complete connection.

As well shown in FIGS. 1, 2 and 5, the checker 7 is fitted on an outer periphery or an outer peripheral surface of the connector housing 3. The checker 7 is made of polyacetal (POM) and is formed relatively flexible, and resiliently deformable. The checker 7 has a thin-walled checker body 85 curving along an arc of a diameter generally identical to an outer peripheral surface of the connector housing 3. The checker body 85 is provided integrally with a pull ring (pull-out portion) 89 having a flat fingerhold portion (straight portion) 87 at a portion of an inner peripheral surface thereof on an opposite side of the checker body 85, at the widthwise center part of an outer portion or outer peripheral portion thereof. Further, the checker body 85 is formed with a flat portion (straight portion) 91 at the widthwise center part on an inner surface or inner peripheral surface thereof, of which length is substantially identical to width of the flat region 45 of the connector hosing 3. Furthermore, the checker body 85 is provided integrally with inwardly directed engagement portions 93, 93 projecting in a widthwise inward direction or a radially inwardly direction on widthwise opposite ends thereof. The inwardly directed engagement portions 93, 93 integrally comprises base portions 95, 95 widthwise or radially outside, and push-out portions 97, 97 widthwise or radially inside. The base portions 95, 95 are formed with walls somewhat thicker than the checker body 85, in integrally connecting relation with opposite ends of the checker body 85 respectively. The push-out portions 97, 97 include both side surfaces in a direction of thickness thereof or in an axial direction which are symmetrically gently inclined so as to be gradually thinner radially inwardly. Widthwise or radially inner ends of the push-out portions 97, 97 extend in a direction perpendicular to the direction of the flat portion 91 extending. The base portions 95, 95 include short stop engagement surfaces 99, 99 as a stopper or a locking portion (refer to FIG. 6.) inside or radially inside of a root position thereof (a position bordering the checker body 85 and the base portion 95) being somewhat ramped toward inward or radially inward direction in a pull-out direction (in a direction of the flat portion 91: in a direction shown by an arrow in FIG. 7). That is, the short stop surfaces 99, 99 are ramped inwardly upwards in FIGS. 1 and 5. The inwardly directed engagement portions 93, 93 include retaining surfaces 101, 101 ramped toward a fit-on direction (refer to a vertical arrow in FIG. 1) inwardly or radially inwardly and extending from inner or radially inner ends of the short stop engagement surfaces 99, 99 toward inner or radially inner ends of the push-out portions 97, 97. Widthwise or radially outward portions of the retaining surfaces 101, 101 are defined by the base portions 95, 95, while widthwise or radially inner portions thereof are defined by the push-out portions 97, 97.

Figure 3:
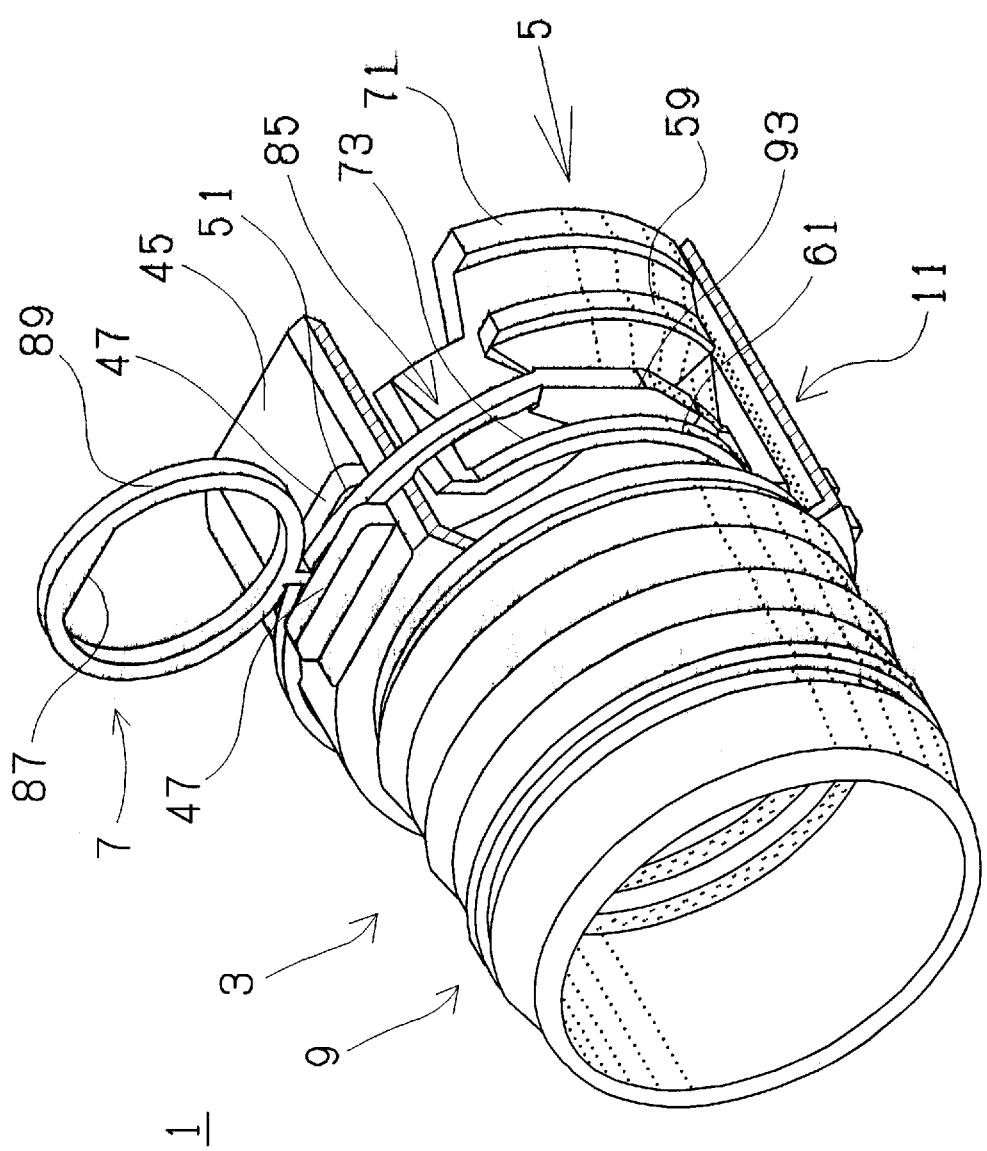
FIG. 3 is an assembled, partly-broken, perspective view of the quick connector with function of verifying complete connection

Thus configured checker 7 is fitted or mounted along an outer peripheral surface of the connector housing 3 or embracing an outer peripheral surface of the connector housing 3 in contacting relation entirely therewith, so that the position of the flat portion 91 is fitted in the fit-in slot 51 defined by the elongate ribs 47, 47 on the flat region 45 of the connector housing 3 in contact with the flat region 45, the inwardly directed engagement portions 93, 93 enter in the engagement windows 43, 43 respectively, and the short stop engagement surfaces 99, 99 (here inner end portions, radially inner end portions or radially inner ends of the short stop engagement surface 99, 99) engage with one circumferential ends 103, 103 of the engagement windows 43, 43. The checker 7 is thereby fitted on the connector housing 3 not to be pulled out due to engagement or locking engagement between the short stop engagement surfaces 99, 99 and the one circumferential ends 103, 103 of the engagement windows 43, 43, even if the pull ring 89 is pulled in a pull-out direction (a vertically outward direction from the flat region 45). The checker 7 is being fitted on the connector housing 3 by sliding the inwardly directed engagement portions 93, 93 over an outer peripheral surface of the connector housing 3 toward the engagement windows 43, 43 respectively. As the inwardly directed engagement portions 93, 93 are progressively slid over an outer peripheral surface of the connector housing 3, the checker body 85 is resiliently deformed in an opening direction. On reaching the engagement windows 43, 43, the inwardly directed engagement portions 93, 93 enter therein respectively under spring back force of the checker body 85, resulting snap-engagement between the short stop engagement surfaces 99, 99 and the one-circumferential ends 103, 103 of the engagement windows 43, 43. Referring specifically to FIGS. 3 and 5, the radially inner ends of the inwardly directed engagement portions 93, 93 seat in the engagement slits 73, 73 of the retainer 5 through the engagement windows, 43, 43, and a distance between radially inner ends of the inwardly directed engagement portions 93, 93 is generally identical to an outer diameter of the pipe 63. Further, as a distance between the elongate ribs 47, 47, namely width of the fit-in slot 51 is designed generally identical to thickness of a position of the flat portion 91 of the checker body 85, the checker 7 is never inclined, for example, if the pull ring 89 is pulled in an axially inclining direction. The checker 7 is configured so that the checker 7 is fitted on the connector housing 3 from either on one flat region 45 or the other flat region 45. Furthermore, the checker 7 is configured so as to fit on the connector housing 3 similarly either with a surface of one axial side or a surface of an opposite axial side toward one axial side, in bi-directional manner.

And, as well seen in FIGS. 1 and 5, a cut-away 105 is formed in the pull ring 89 around a root portion thereof. The cut-away 105 allows the pull ring 89 to break when the checker 7 is pulled by force. That prevents the checker 7 from being pulled out, when the pipe 63 is incompletely connected with the quick connector 1, and pulled by strong force. Further, as well seen in FIGS. 2 and 5, the checker body 85 is provided with recessed portions 107, 107 on widthwise opposite end portions of an inner surface to receive a reference number indicated with a numeral reference 109 formed in relief on an outer peripheral surface of the connector housing 3 therein, thereby preventing the checker 7 loosing off an outer peripheral surface of the connector housing 3. Meanwhile, numeral reference 111 in FIGS. 4 and 5 shows a projecting portion seating in the notched portion 67 of the main body 55 of the retainer 5 to restrain rotational movement of the retainer 5. Further, a projecting portion 113 (refer to FIG. 5) of the same configuration as the projecting portion 111 is formed in radially symmetrical position, so that the retainer 5 in rotating 180° from its position in FIG. 1 can be fitted in the retainer holding portion 11 likewise.

The pipe 63, for example to be joined with the tube, which is made of metal, is inserted in the quick connector 1 from an opening on an opposite axial end of the retainer holding portion 11, more specifically, in the main body 55 of the retainer 5 from a side of the latching ends 71, 71 of the operation arms 69, 69, and is to be fitted in the quick connector 1. The pipe 63 has an inserting end portion 115 wherein the annular engagement projection 65 is formed on an outer peripheral surface, at one axial end side thereof. The pipe 63 is pushed, and fittingly inserted into the quick connector 1 so that the annular engagement projection 65 progresses radially expanding inner surface of the main body 55 of the retainer 5 until the annular engagement projection 65 seats in the engagement slits 73, 73 in snap-engagement relation therewith. The annular engagement projection 65 which has fitted and snap-engaged in the engagement slits 73, 73 of the main body 55 of the retainer 5 blocks or limits further axial in-and-out movement of the pipe 63 with respect to the quick connector 1. That is, the pipe 63 is thereby almost locked against relative axial movement in the quick connector 1. One axial end or inserting end of the pipe 63 reaches in the resin bush 35 fitted in the resin tube connecting portion 9 beyond a pair of the O-rings 31, 31 provided in the resin tube connecting portion 9 and thereby a seal is formed by the O-rings 31, 31 between an outer periphery surface of the pipe 63 and an inner periphery surface of the quick connector 1. The retainer 5 is usually fitted slightly loosely in the retainer holding portion 11 with slight axial play therein. However, at least when the pipe 63 is fully inserted therein, one axial end of the main body 55 is in abutment relation relative to the annular abutment surface 53. And, an inner diameter of the small diameter portion 29 of the resin tube connecting portion 9 and an inner diameter of the resin bush 35 are designed generally identical to an outer diameter of the pipe 63.

When an inserting end portion 115 of the pipe 63 is inserted in the main body 55 of the retainer 5 and the annular engagement projection 65 of the pipe 63 reaches a position of opposite axial ends of the engagement slits 73, 73, the annular engagement projection 65 abuts an radially inner end portion of the inwardly directed engagement portions 93, 93 of the checker 7 which projects inside of the main body 55 through the engagement slits 73, 73 of the retainer 5 as a result that the main body 55 of the retainer 5 is expanded by the annular engagement projection 65. When the inserting end portion 115 of the pipe 63 has been further inserted, the annular engagement projection 65 is pushing back the inwardly directed engagement portions 93, 93 radially outwardly, and progresses up to the axial position corresponding to the engagement slits 73, 73. A portion of the inwardly directed engagement portions 93, 93 which the annular engagement projection 65 abuts is an opposite axial side surface of the push-out portion 97. And, as the opposite axial side surface of the push-out portion 97 is inclined toward an inward, or radially inward direction in one axial direction, although slightly, the inwardly directed engagement portions 93, 93 are smoothly pushed back radially outwardly. When the annular engagement projection 65 reaches the axial position corresponding to the engagement slits 73, 73, the one axial end portion 61 of the main body 55 of the retainer 5 which is expanded springs back to its original, or generally original dimension, and the annular engagement projection 65 seats and engages in the engagement slits 73, 73 of the main body 55. On the other hand, the inwardly directed engagement portions 93, 93 of the checker 7 are held to be deflected and moved radially outwardly in abutment relation with the annular engagement projection 65 or portions surrounding the engagement slits 73, 73. In this state, locking engagement relations between the short stop engagement surfaces 99, 99 of the inwardly directed engagement portions 93, 93 and the one circumferential ends 103, 103 of the engagement windows 43, 43 are released. And the retaining surfaces 101, 101 of the inwardly directed engagement portions 93, 93 are pressed against the one circumferential ends 103, 103 of the engagement windows 43, 43, and thereby the checker 7 is held in position. Therefore, the checker 7 is not fell off the connector housing 3 quite easily. However, as the retaining surfaces 101, 101 are formed in slightly or gently tapered configuration inwardly, or radially inwardly, the checker 7 can be pulled out of the connector housing 3 easily when the pull-ring 89 is pulled in a pull-out direction (refer to an arrow in FIG. 7). By pull-out of the checker 7, it can be verified that the annular engagement projection 65 is engaged in the engagement slits 73, 73 and thereby the pipe 63 is connected with the quick connector 1 correctly.

In the event of removing the pipe 63 from the quick connector 1, the latching ends 71, 71 of the operation arms 69, 69 received in the receiving recessed portions 77, 77 are pressed radially inwardly from outside to narrow a radial space between the operation arms 69, 69, thus a radial space between the engagement tabs 59, 59. And, thereby the engagement tabs 59, 59 are out of the engagement windows 43, 43, and the retainer 5 can be relatively pulled out of the connector housing 3 As the retainer 5 is relatively pulled out of the connector housing 3, the pipe 63 will have been also pulled out of the quick connector 1 or the connector housing 3 along with the retainer 5.

Figure 9:
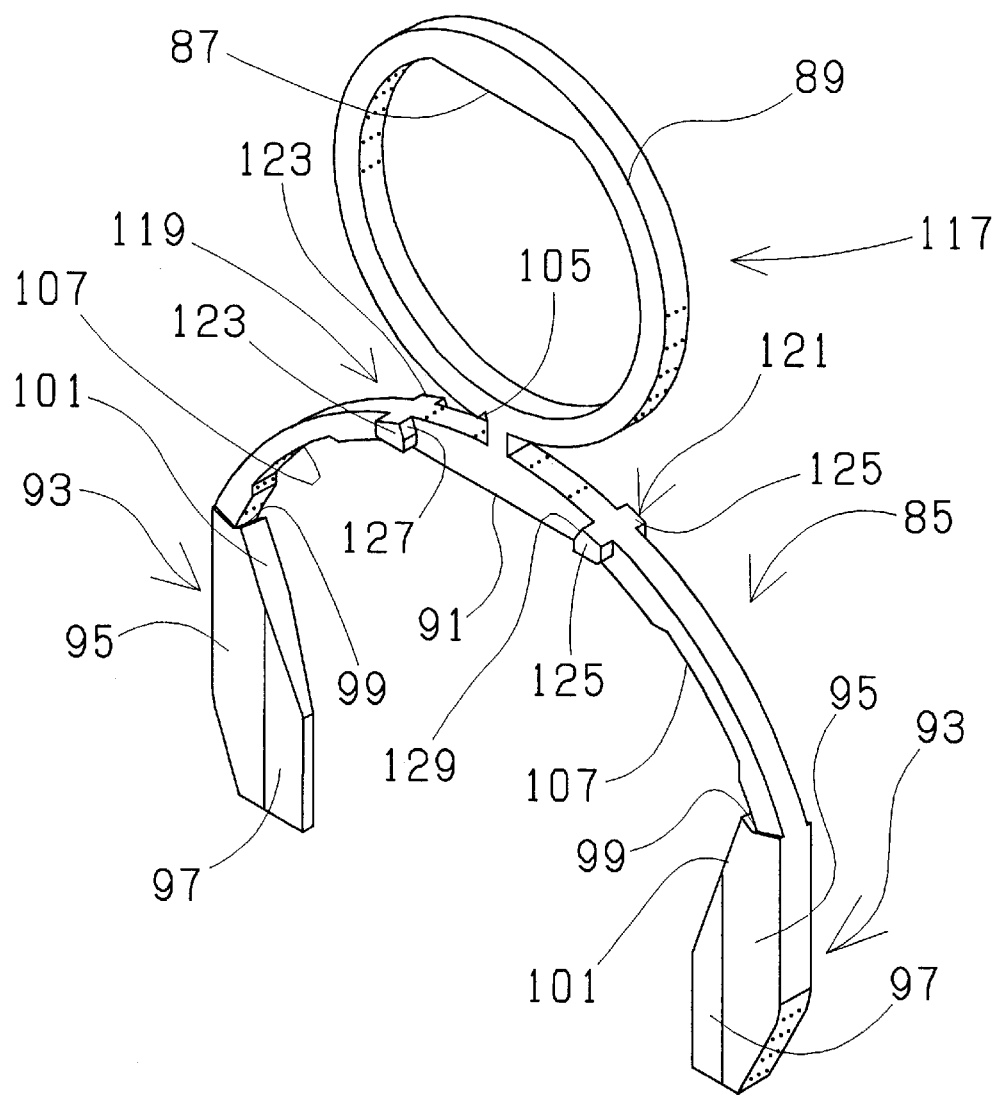
FIG. 9 is a perspective view of a checker with another configuration.

FIG. 9 shows a checker of another configuration. A checker 117 of another configuration has a modified configuration of the checker 7, includes circumferential movement preventive means added to the checker 7. Therefore, on portions identical to the checker 7 explanations are almost omitted herein. The portions of the checker 117 which are not specifically referred herein should be understood to have configurations and functions identical to the corresponding portions of the checker 7. The checker body 85 of the checker 117 is formed with one circumferential movement preventive means 119 near one longitudinal end of the flat portion 91, and the other circumferential movement preventive means 121 near an opposite longitudinal end thereof. The one circumferential movement preventive means 119 comprises axial projections 123, 123 extending or projecting in one and an opposite axial directions integrally from one and an opposite axial side surfaces of the checker body 85 respectively near one longitudinal end of the flat portion 91. On the other hand, the other circumferential movement preventive means 121 comprises axial projections 125, 125 extending or projecting in one and an opposite axial directions integrally from one and an opposite axial side surfaces of the checker body 85 respectively near an opposite longitudinal end of the flat portion 91. Each of the axial projections 123, 125 is formed like substantially or generally rectangular in cross-section. However, circumferentially or longitudinally inner surfaces 127, 129 (with reference to FIG. 13, the surfaces to contact circumferential or longitudinal end surfaces 141, 143 of the elongate ribs 131, 131) of the axial projections 123, 125 comprise a ramp surface portion inclined circumferentially inwardly from an outer end toward an inner end to a position near an inner end, and a vertical surface portion extending in a fit-on direction on an inner side from the ramp surface portion respectively. A circumferential distance between the one axial projection 123 and the other axial projection 125, or a circumferential distance between the one circumferential movement preventive means 119 and the other circumferential movement preventive means 121 is designed generally identical to a length of the elongate rib 131.

A connector housing 133 of a quick connector 135 with function of verifying complete connection, wherein the retainer 5 and the checker 117 are adapted, is configured to modify a design of the elongate rib 47 of the connector housing 3. Therefore, explanations on portions identical to the connector housing 3 will be almost omitted herein. That means, the portions of the connector housing 133 which are not specifically referred to here should be understood to have configurations and functions identical to corresponding portions of the connector housing 3.

Figure 10:
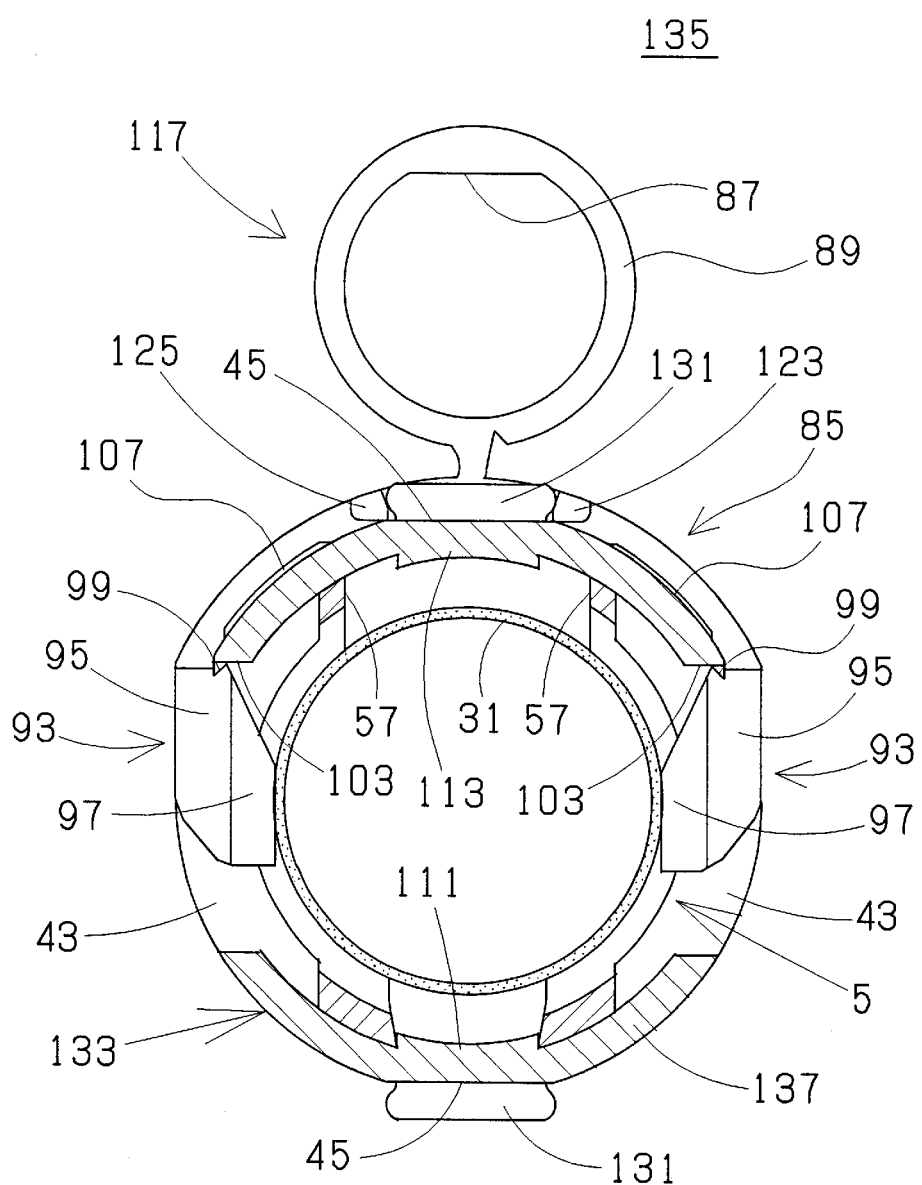
FIG. 10 is a sectional view taken in a radial direction of a quick connector with function of verifying complete connection of the present invention wherein the checker with another configuration is adapted.
Figure 11:
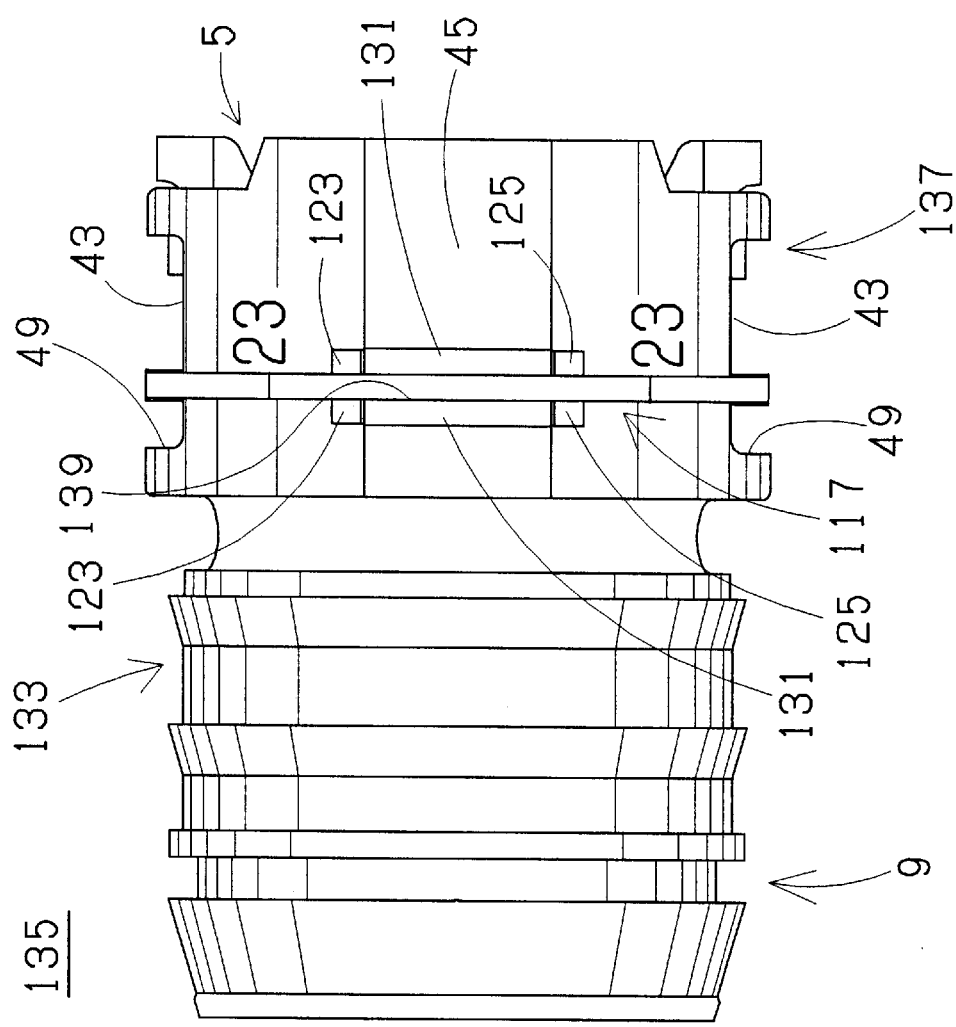
FIG. 11 is a plan view of the quick connector with function of verifying complete connection wherein the checker with another configuration is adapted.
Figure 13:
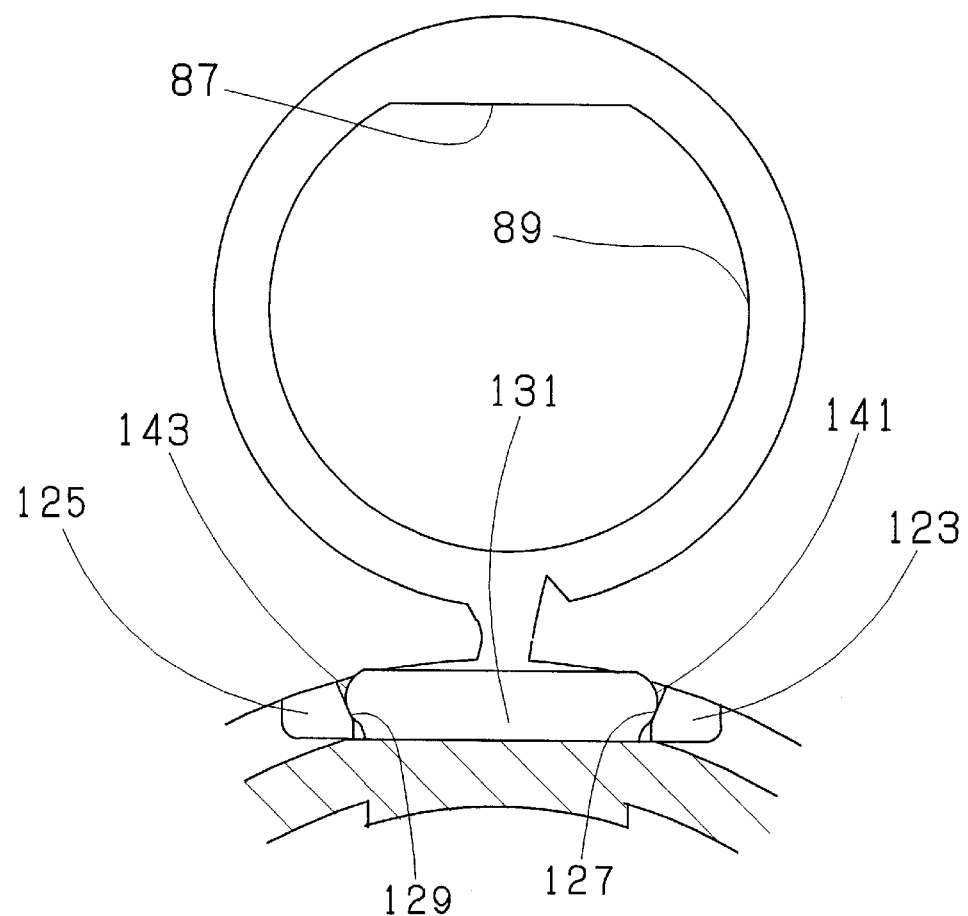
FIG. 13 is a view showing engagement relation between an elongate rib and axial projections.

As well shown in FIGS. 10, 11 and 13, the flat regions 45, 45 formed on a retainer holding portion 137 of the connector housing 133 are provided on one axial side thereof with two elongate ribs 131, 131 of the same configuration, axially slightly spaced in parallel relation with one another. Two elongate ribs 131, 131 extend circumferentially throughout substantially entire width of the flat regions 45, 45. As the elongate rib 131 of one axial side is located on an opposite axial side from the one axial ends 49, 49 of the engagement windows 43, 43, a fit-in slot (an axial space) 139 defined by the elongate ribs 131, 131 is located rather on an opposite axial side from the one axial ends 49, 49 of the engagement windows 43, 43. The checker 117 is fitted or mounted along an outer peripheral surface of the connector housing 133 or embracing an outer peripheral surface of the connector housing 133 in contact relation entirely therewith, so that the position of the flat portion 91 is fitted in the fit-in slot 139 defined by the elongate ribs 131, 131 on the flat region 45 of the connector housing 133 in contact with the flat region 45, the elongate ribs 131, 131 are fitted between the axial projections 123 and 125 respectively or the axial projections 123 and 125 clip the elongate ribs 131, 131 therebetween, the inwardly directed engagement portions 93, 93 enter in the engagement windows 43, 43 respectively, and the short stop engagement surfaces 99, 99 snap-engage with the one circumferential ends 103, 103 of the engagement windows 43, 43 respectively. A width of the fit-in slot 139 defined by the elongate ribs 131, 131 is designed generally identical to thickness of the position of the flat portion 91 in the checker 117 or the checker body 85. Abutment relation between the axial projection 123, 125 and the circumferential end surfaces 141, 143 of the elongate rib 131 restrain the checker 7 from moving circumferentially.

Figure 12:
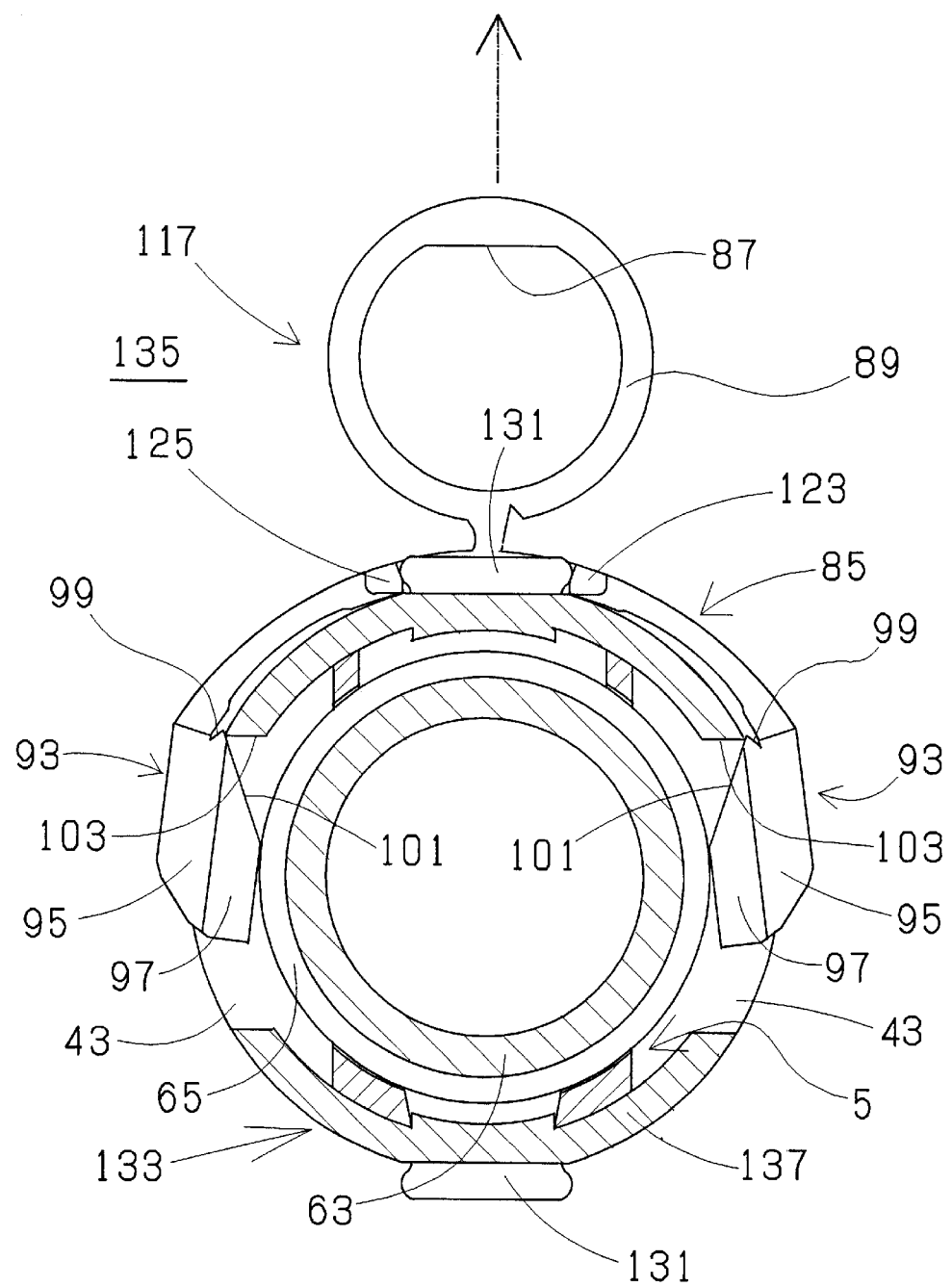
FIG. 12 is a sectional view taken in a radial direction showing a pipe inserted in and connected with the quick connector with function of verifying complete connection wherein the checker with another configuration is adapted.

The one circumferential end surface 141 and the other circumferential end surface 143 of each elongate rib 131 are formed in curved surfaces outwardly projecting at heightwise center thereof. In the checker 117, the one axial projection 123 and the other axial projection 125 of the checker 117 catch each elongate rib 131 therebetween, while the ramp surface portion of the curved surface 127 of the one axial projection 123 snap-engages with an inner end side or lower side of the one circumferential end surface 141 of the elongate rib 131, and a ramp surface portion of the inner surface 129 of the other axial projection 125 snap-engages with an inner side or lower side of the other circumferential end surface 143 of the elongate rib 131. As well shown in FIG. 12, since the checker 117 is in this way restrained not to escape easily from the fit-in slot 139 between the elongate ribs 131, 131, when the pipe 63 is connected with the quick connector 135, and an locking engagement between the inwardly directed engagement portions 93, 93 of the checker 117 and the engagement windows 43, 43 is released, it is prevented that the checker 117 is easily come off the connector housing 133. Compared to a disengagement prevention structure or retaining structure provided only by pressing the retaining surfaces 101, 101 of the inwardly directed engagement portions 93, 93 against the one circumferential ends 103, 103 of the engagement windows 43, 43, this disengagement prevention structure secures positive effects for prevention disengagement or for retaining without adversely or substantially affecting work for pulling the checker 117 out for verifying complete connection. And, even if an operator carelessly touches the checker 117 by hand or the like and the checker 117 escapes out of the fit-in slot 139, a disengagement preventive function or retaining function is still effective as the retaining surfaces 101, 101 of the inwardly directed engagement portions 93, 93 abut or press against the one circumferential ends 103, 103 of the engagement windows 43, 43. Further, rear surface inner ends of the axial projections 123, 125 contact with the flat region 45 which is partly exposed at positions of circumferentially opposite ends of the elongate ribs 131, 131. This also enhances stability in mounting the checker 117 on the quick connector 135. The rear surface inner end portions of the axial projections 123 and 125 are formed co-planar with one longitudinal end portion and an opposite longitudinal end position of the flat portion 91, respectively.

Figure 14:
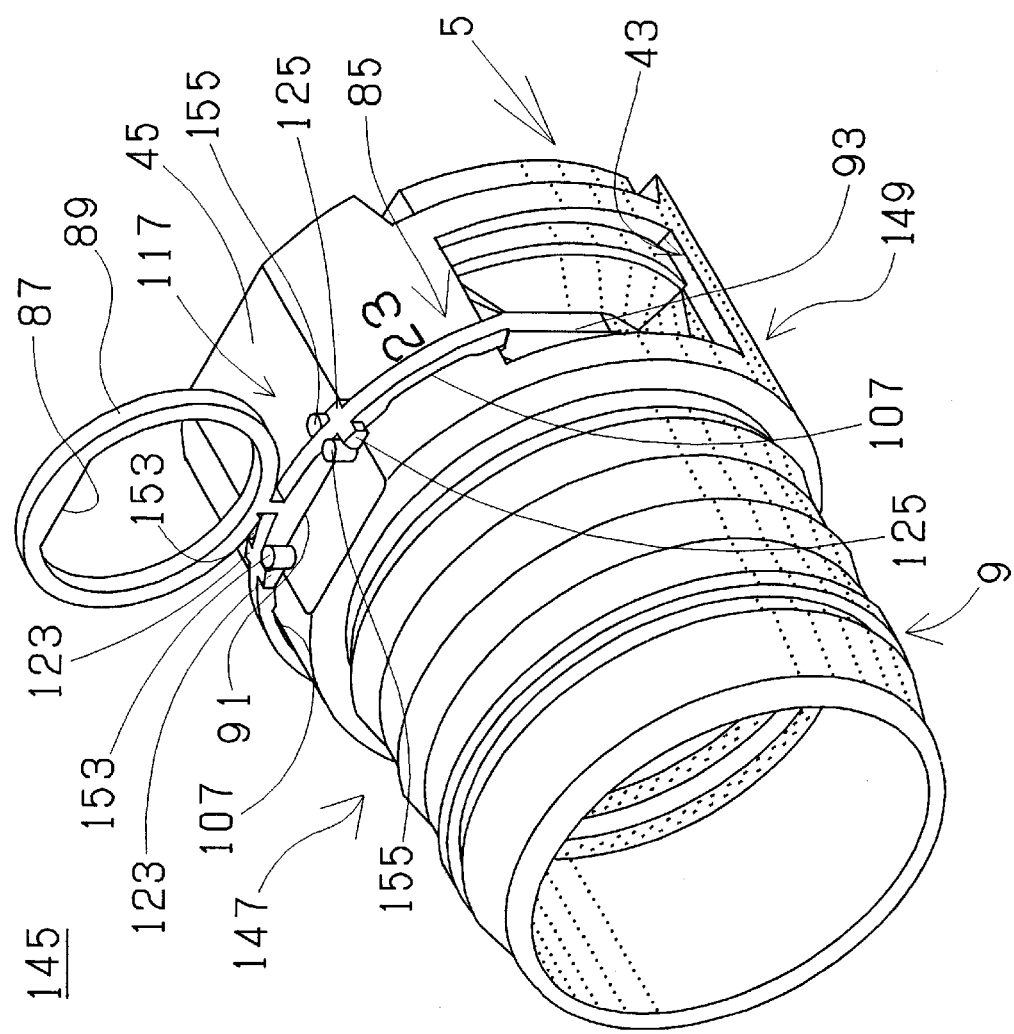
FIG. 14 is a perspective view of a quick connector with function of verifying complete connection of the present invention wherein a connector housing with another configuration is adapted.
Figure 15:
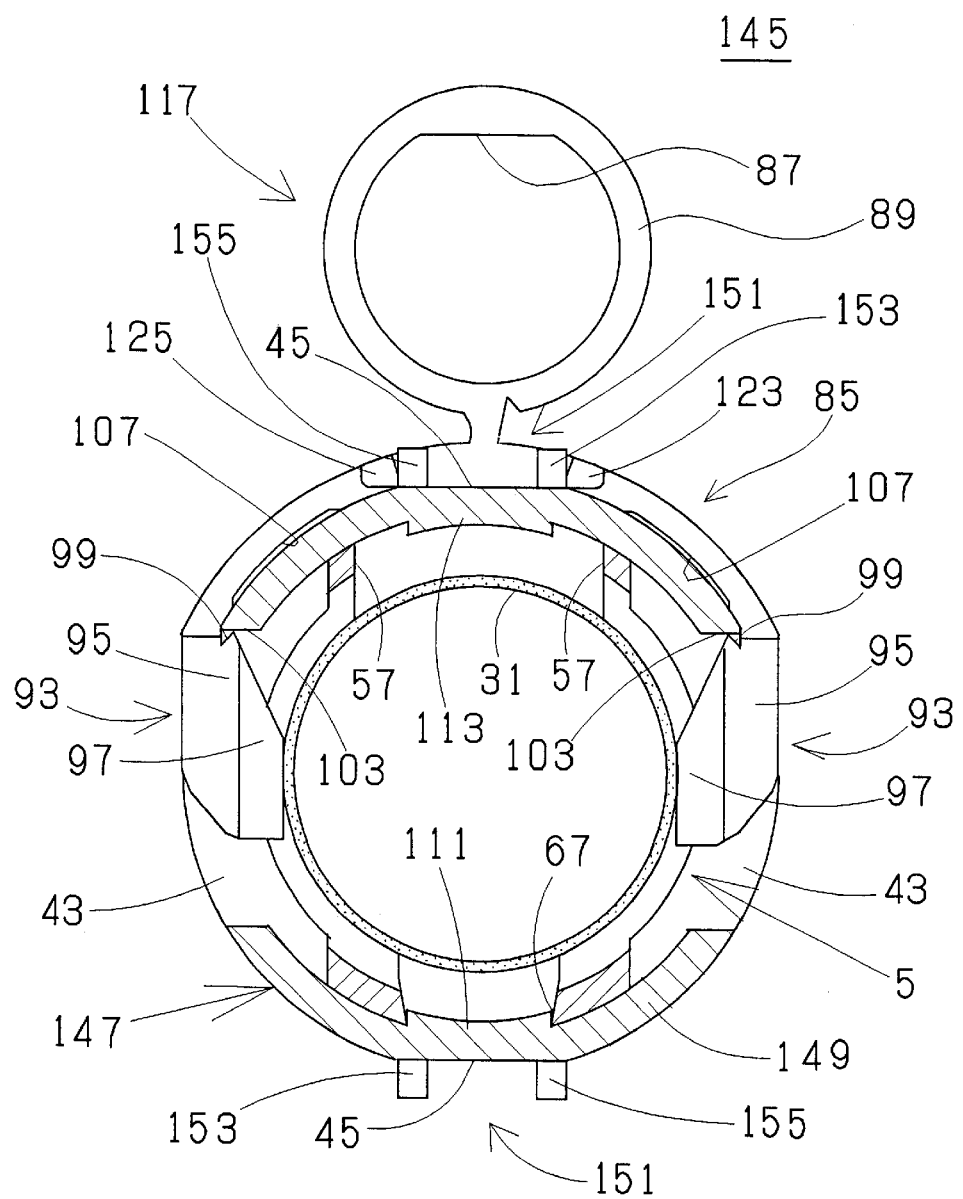
FIG. 15 is a sectional view taken in a radial direction of the quick connector with function of verifying complete connection wherein the connector housing with another configuration is adapted.
Figure 16:
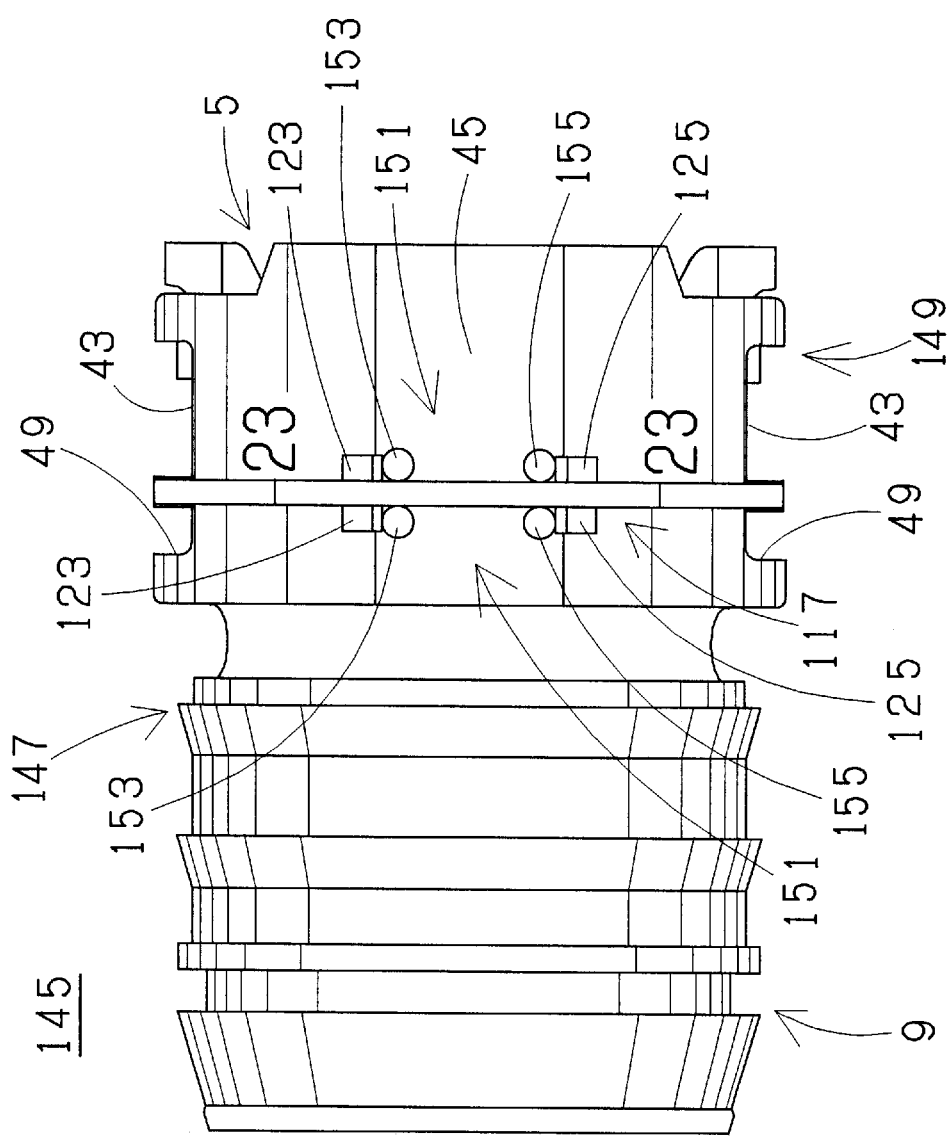
FIG. 16 is a plan view of the quick connector with function of verifying complete connection wherein the connector housing with another configuration is adapted.

FIGS. 14 to 16 shows the quick connector having a connector housing of another configuration. A quick connector 145 provided with the retainer 5 and the checker 117 may include a connector housing 147 of another configuration. However, the connector housing 147 is configured by modifying structures of a portion of the elongated ribs 131, 131 on the connector housing 133. Therefore, the explanations on the portions identical to the connector housing 133 are almost omitted herein. That is, the portions of the connector housing 147 which are not specifically referred to here should be understood to have configurations and functions identical to corresponding portions of the connector housing 133. In the connector housing 147, the flat regions 45, 45 of a retainer holding portion 149 are provided with a pair of protrusion structures (axial movement preventive means) 151, 151 of identical configuration in slightly axially spaced relation with one another, on one axial side thereof. Each protrusion structure 151 comprises a pair of cylindrical protrusions (raised portions) 153, 155 located in positions axially coincident with one another, on one widthwise end portion and an opposite widthwise end position of the flat region 45. As the protrusion structure 151 of one axial side is located on an opposite axial side from the one axial ends 49, 49 of the engagement windows 43, 43, a fit-in position between the protrusion structures 151, 151 is located rather toward an opposite axial side from the one axial ends 49, 49 of the engagement windows 43, 43. The checker 117 is fitted or mounted along an outer peripheral surface of the connector housing 147 or embracing an outer peripheral surface of the connector housing 147 in contact relation entirely therewith, so that the position of the flat portion 91 is fitted in an axial space, gap or slot between the protrusion structures 151, 151 on the flat region 45 of the connector housing 147 in contact with the flat region 45, the protrusion structures 151, 151 are fitted between the axial projections 123, 125 respectively or the axial projections 123, 125 clip the protrusions 153, 155 therebetween. The inwardly directed engagement portions 93, 93 enter in the engagement windows 43, 43 respectively, and the short stop engagement surfaces 99, 99 snap-engage with the one circumferential ends 103, 103 of the engagement windows 43, 43. An axial distance (axial space) between the protrusion structures 151, 151, or an axial distance between the protrusions 153, 153 and an axial distance between the protrusions 155, 155 are generally identical to thickness of the position of the flat portion 91 of the checker 117 or of the checker body 85. Accordingly, due to contact or abutment relation between the protrusions 153, 155 and the position of the flat portion 91, the checker 117 is restrained from moving axially. Further, a circumferential distance or longitudinal distance between the one axial projection 123 and the other axial projection 125 of the checker 117 is designed generally identical to a circumferential or longitudinal distance between the protrusion 153 and the protrusion 155. More specifically, a distance between the inner surface 127 of the one axial projection 123 and the inner surface 129 of the other axial projection 125 is designed generally identical to a circumferential distance between an outer circumferential end of the protrusion 153 and an outer circumferential end of the protrusion 155. Therefore, as the axial projections 123, 125 contact with or abut the protrusions 153, 155 respectively, the checker 117 is restrained from moving circumferentially. Furthermore, rear surface inner ends of the axial projections 123, 125 contact with the flat region 45, which is somewhat exposed outside circumferentially of the protrusions 153, 155. Thereby enhanced stability is brought about for mounting the checker 117 on the connector housing 147.

We claim:

1. A quick connector to be connected with a pipe including an inserting end portion provided with an annular engagement projection, and having a function to verify complete connection with the pipe, comprising:

a tubular connector housing provided with a tube connecting portion on one axial side thereof and a retainer holding portion having at least one engagement window on an opposite axial side thereof, an annular or a generally annular retainer configured so that the annular engagement projection of the pipe snap-engages with the retainer when the pipe inserting potion of the pipe is inserted in the connector housing, and fitted to the retainer holding portion to engage with the engagement window, a checker having a checker body configured so as to be along or generally along an outer peripheral surface of the connector housing and provided with a pull-out portion, and at least one engagement portion integrally formed on the checker body, the checker being fitted or mounted on an outer peripheral surface of the connector housing in locking relation in a pull-out direction by engagement between the engagement portion and the engagement window, the engagement portion of the checker body being configured so as to be pushed by the annular engagement projection, and thereby deformed and moved to allow the checker to be pulled out when snap-engagement between the annular engagement projection and the retainer brings about complete connection between the pipe and the quick connector, the connector housing or the outer peripheral surface of the connector housing being provided integrally with a pair of axial movement preventive means projecting radially outwardly in axially spaced relation with one another to restrain axial movement of the checker body, the axial movement preventive means respectively having one circumferential end portion and the other circumferential end portion circumferentially spaced a proper distance from the one circumferential end portion, and the checker body being fitted in an axial space defined between a pair of the axial movement preventive means so as to be restrained to move toward one axial side and an opposite axial side.

2. The quick connector as set forth in claim 1 wherein an axial distance between a pair of the axial movement preventive means is formed generally identical to thickness of the checker body.

3. The quick connector as set forth in claim 1 wherein the axial movement preventive means are elongate ribs extending circumferentially an appropriate length respectively.

4. The quick connector as set forth in claim 1 wherein the axial movement preventive means comprise two raised portions disposed properly spaced circumferentially, respectively.

5. The quick connector as set forth in claim 1 wherein the retainer holding portion is provided integrally with the tube connecting portion on one axial end thereof, and the tube connecting portion is configured so that a tube is fitted over up to a position of an opposite axial end thereof.

6. The quick connector as set forth in claim 1 wherein the checker body is formed integrally with a pair of circumferential movement preventive means to prevent the checker body from movement toward one and the other circumferential directions in abutment or contact relation with one circumferential end and the other circumferential end of the axial movement preventive means.

7. The quick connector as set forth in claim 6 wherein the circumferential movement preventive means are axial projections integrally formed on the checker body respectively.

8. The quick connector as set forth in claim 7 wherein the axial projections are engaged with one circumferential end and the other circumferential end of the axial movement preventive means in a pull-out direction respectively.

* * * * *